US007178938B2

(12) United States Patent
Sordjan, Jr.

(10) Patent No.: US 7,178,938 B2
(45) Date of Patent: Feb. 20, 2007

(54) FLASHLIGHT AND MAGNIFYING LENS COMBINATION

(76) Inventor: Simeon Sordjan, Jr., 72-03A Forest Ave, Ridgewood, NY (US) 11835

( * ) Notice: Subject to any disclaimer, the term of this patent is extended or adjusted under 35 U.S.C. 154(b) by 90 days.

(21) Appl. No.: 11/036,901

(22) Filed: Jan. 14, 2005

(65) Prior Publication Data

US 2005/0152130 A1  Jul. 14, 2005

Related U.S. Application Data

(60) Provisional application No. 60/536,413, filed on Jan. 14, 2004.

(51) Int. Cl.
*F21L 7/00* (2006.01)
(52) U.S. Cl. ............... 362/190; 362/202; 362/208
(58) Field of Classification Search ............ 362/190, 362/202, 208
See application file for complete search history.

(56) References Cited

U.S. PATENT DOCUMENTS

| 4,750,095 A * | 6/1988 | Huang ................ 362/190 |
| 5,765,938 A * | 6/1998 | Rousso et al. .......... 362/198 |
| 6,816,438 B1 * | 11/2004 | Zeller .................. 368/10 |

* cited by examiner

*Primary Examiner*—Sandra O'Shea
*Assistant Examiner*—James W Cranson, Jr.
(74) *Attorney, Agent, or Firm*—Jennifer Meredith, Esq.; Meredith & Keychain, PLLC

(57) ABSTRACT

An apparatus for lighting and magnifying having a tubular housing containing a power means, an illumination means, and an illumination means cover; a magnifying lens, the said magnifying lens being substantially the same size and shape as the illumination means cover; and a hinge connecting the tubular housing and the magnifying lens, allowing the magnifying lens to rotate a maximum of 270 degrees.

5 Claims, 4 Drawing Sheets

FLASHLIGHT AND MAGNIFYING LENS COMBINATION

This application claims priority to application Ser. No. 60/536,413, filed Jan. 14, 2004, entitled "Flashlight and magnifying lens combination."

Flashlights and lighting devices are well known within the art. Flashlights provide an easy, portable manner in which illumination may be provided for a dark area.

Also known are magnifying glasses, for the purpose of providing better viewing of objects. Such devices are often used to assist individuals with seeing objects or viewing smaller details of objects. This is often desirable when working on handy projects. However, it is also desirable to provide better illumination when the goal is to provide better viewing of small or detailed objects.

U.S. Design Pat. D 296,792 discloses a magnifying glass attachment device. As shown, the '792 patent provides a circular attachment device that may be optionally attached to a flashlight. However, such an attachment device may be lost, is clumsy to attach and does not allow for the magnifying glass to be stored in a closed position.

U.S. Pat. No. 5,967,643 provides a retractable lighted magnifier and flashlight. However, the '643 provides a small lens on the side of the housing. The problem with '643 patent is that it does not allow the light to shine directly in the item to be viewed. Further, it does not allow for the magnifying lens to magnify the light.

None of the prior art provides a flashlight device with a magnifying glass attachment that provides a illumination on an object that may be viewed through the magnifying glass, provides for magnified light by allowing the magnifying glass to cover the illumination means and also provides for an easy, single apparatus that is convenient and contained when in a closed position.

SUMMARY OF THE INVENTION

The present invention provides a single illumination apparatus that allows for side by side illumination and magnification, as well as illuminated lighting.

According to one embodiment of the present invention, an apparatus for lighting and magnifying is disclosed, the apparatus comprising: a tubular housing having contained therein a power means, an illumination means, and an illumination means cover; a magnifying lens, wherein the magnifying lens is substantially the same size and shape as the illumination means cover; and a connection means connecting the tubular housing and the magnifying lens, allowing the magnifying lens to rotate a maximum of 270 degrees.

According to another embodiment, an apparatus for lighting and magnifying is disclosed, having a tubular housing having contained therein with an illumination means; an illumination means cover; a power means having a battery, a conduction means for conducting power between said battery and said illumination means; and a switch means for providing an on and off power between said battery and said illumination mean through said conduction means; a circular magnifying lens, wherein said magnifying lens is substantially the same size and shape as said illumination means cover; and a hinge connecting said tubular housing and said magnifying lens, allowing said magnifying lens to rotate a maximum of 270 degrees.

According to yet another embodiment, an apparatus for lighting and magnifying, the apparatus comprising: a tubular housing having contained therein: an illumination means; an illumination means cover; a power means having a battery, a conduction means for conducting power between the battery and the illumination means; and a switch means for providing an on and off power between the battery and the illumination mean through the conduction means; a circular magnifying lens, wherein the magnifying lens is substantially the same size and shape as the illumination means cover; a circular cover; a hinge connecting the tubular housing, the circular magnifying lens, and the cover, allowing the circular magnifying lens and said circular cover to rotate a maximum of 270 degrees so that when in a closed position said circular magnifying lens is interposed between said circular cover and said illumination means cover.

These and other features, aspects and advantages of the present invention will become better understood with reference to the following drawings, description and claims.

DETAILED DESCRIPTION OF THE DRAWINGS

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
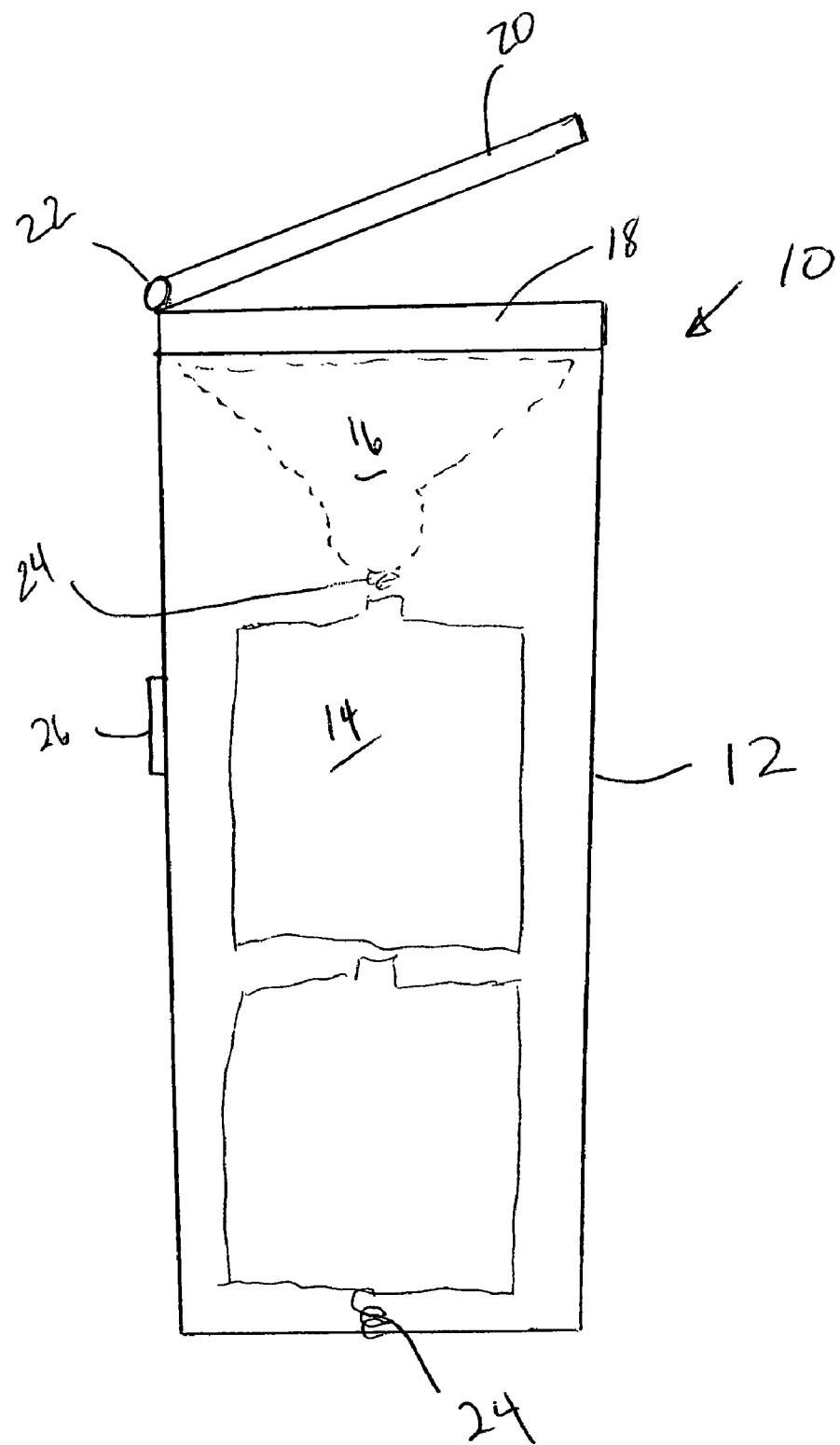
FIG. 1 is a side view according to the present invention.
Figure 2:
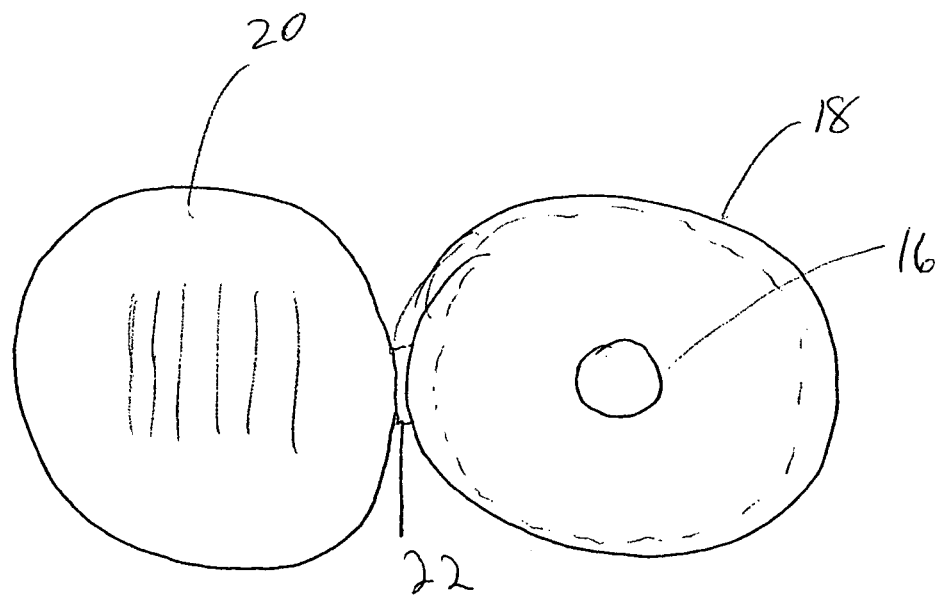
FIG. 2 is a top view according to the present invention.

Turning to FIG. 1, an apparatus 10 is shown for lighting and magnifying. As shown, the apparatus 10 comprising: a tubular housing 12 having contained therein a power means 14, an illumination means 16, and an illumination means cover 18; a magnifying lens 20, wherein the magnifying lens 20 is substantially the same size and shape as the illumination means cover 18; and a connection means 22 for connecting the tubular housing 12 and the magnifying lens 20, allowing the magnifying lens 20 to rotate a maximum of 270 degrees. As shown, the magnifying lens 20 is circular and tubular housing 12 and rotates a maximum of 270 degrees. As shown, the illumination means 16 is a standard light bulb. However, alternatively the housing may a number of different shaped, including a tubular rounded rectangular. The magnifying lens 20 may be a rounded rectangular shape also.

The power means may be comprised of: a battery 14; a conduction means 24 for conducting power between the battery 14 and the illumination means 16; and a switch means 26 for providing an on and off power between the battery 14 and the illumination means 16 through the conduction means 24. The conduction means 24 is comprised of at least two wires.

Figure 3:
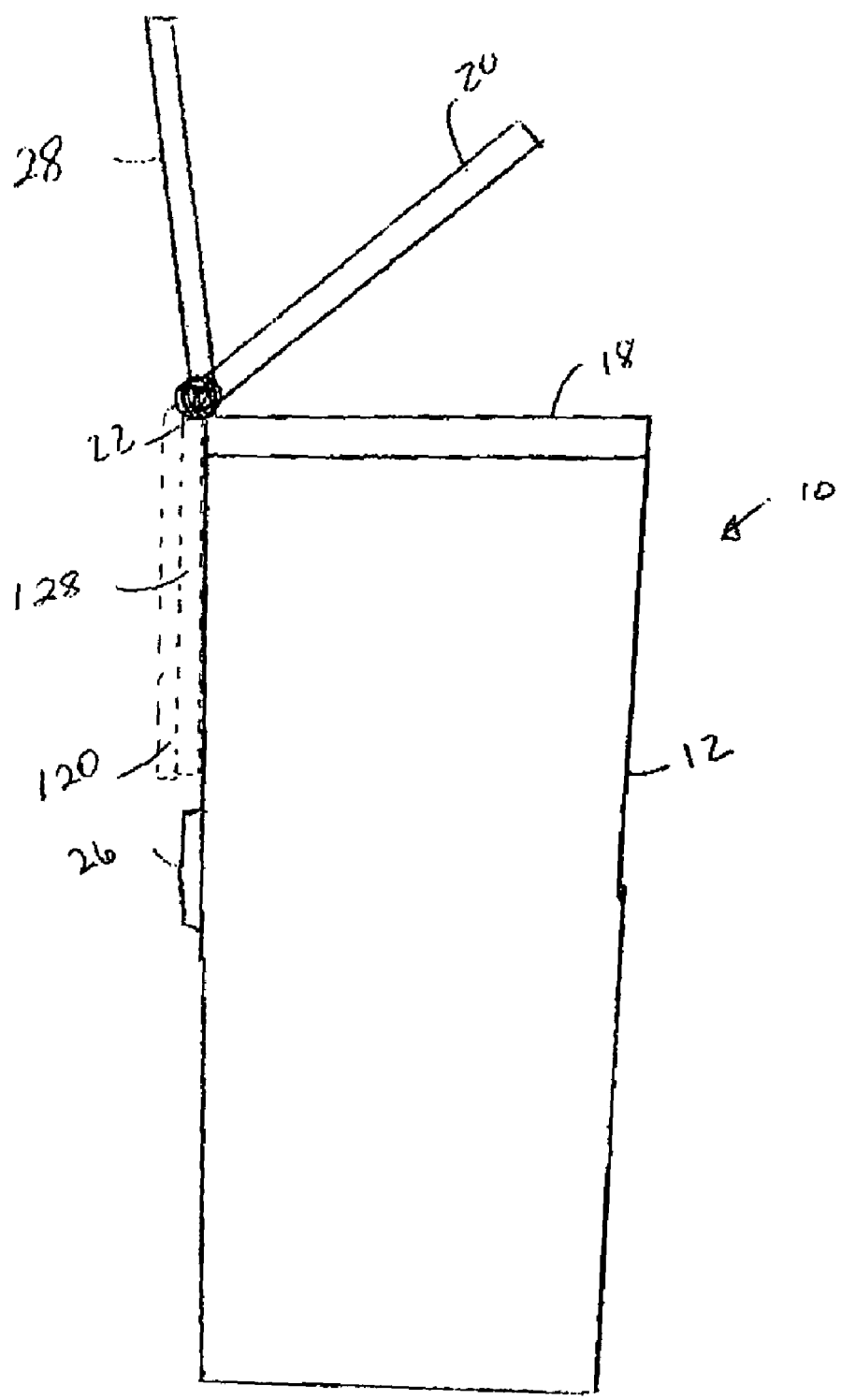
FIG. 3 is a side view according to the present invention.

FIG. 3 depicts a cover 28 for the magnifying lens 20, the cover 28 being attached to the tubular housing 12 on the hinge 22 in an open position. The magnifying lens 120 depicts the magnifying lens 20 in the maximum of 270 degrees position and next to the cover 128. Alternate numbers (120. 128) are used to depict the different positions for the cover 28 and magnifying lens 20.

Figure 4:
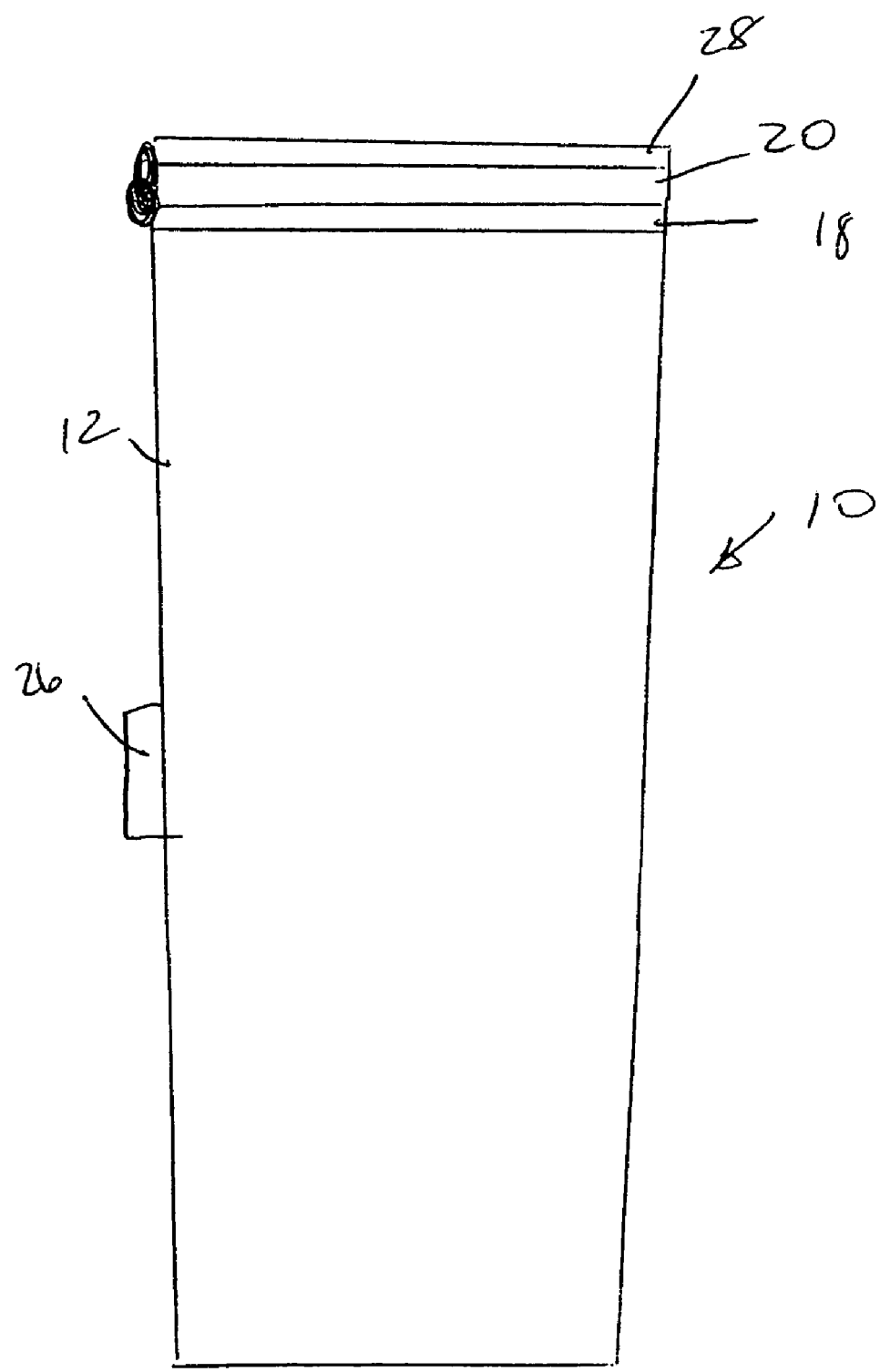
FIG. 4 is a side view according to the present invention.

FIG. 4 depicts a cover 28 for the magnifying lens 20, the cover 28 being in a closed position. The cover is substantially the same size and shape as the magnifying lens and illumination means cover.

It should be understood, of course, that the foregoing relates to preferred embodiments of the invention and that modifications may be made without departing from the spirit and scope of the invention as set forth in the following claims.

I claim:

1. An apparatus for lighting and magnifying, said apparatus comprising:
   a tubular housing having contained therein a power means, an illumination means, and an illumination means cover;
   a magnifying lens, wherein said magnifying lens is substantially the same size and shape as said illumination means cover;
   a connection means for connecting said tubular housing and said magnifying lens, allowing said magnifying lens to rotate a maximum of 270 degrees;
   a cover for said magnifying lens, said cover being attached to said tubular housing on a hinge in an open and closed position.

2. An apparatus for lighting and magnifying, said apparatus comprising:
   a tubular housing having contained therein a power means, an illumination means, and an illumination means cover;
   a magnifying lens, wherein said magnifying lens is substantially the same size and shape as said illumination means cover;
   a connection means for connecting said tubular housing and said magnifying lens, allowing said magnifying lens to rotate a maximum of 270 degrees;
   a cover for said magnifying lens, said cover being attached to said tubular housing on said hinge in an open and closed position and wherein said cover is substantially the same size and shaped as said magnifying lens and said illumination means cover.

3. An apparatus for lighting and magnifying, said apparatus comprising:
   a tubular housing having contained therein:
   an illumination means;
   an illumination means cover;
   a power means having a battery, a conduction means for conducting power between said battery and said illumination means; and
   a switch means for providing an on and off power between said battery and said illumination mean through said conduction means;
   a circular magnifying lens, wherein said magnifying lens is substantially the same size and shape as said illumination means cover;
   a hinge connecting said tubular housing and said magnifying lens, allowing said magnifying lens to rotate a maximum of 270 degrees.
   a cover for said circular magnifying lens, said cover being attached to said tubular housing on said hinge in an open and closed position.

4. An apparatus for lighting and magnifying, said apparatus comprising:
   a tubular housing having contained therein:
   an illumination means;
   an illumination means cover;
   a power means having a battery, a conduction means for conducting power between said battery and said illumination means; and
   a switch means for providing an on and off power between said battery and said illumination mean through said conduction means;
   a circular magnifying lens, wherein said magnifying lens is substantially the same size and shape as said illumination means cover;
   a circular cover;
   a hinge connecting said tubular housing, said circular magnifying lens, and said cover, allowing said circular magnifying lens and said circular cover to rotate a maximum of 270 degrees so that when in a closed position said circular magnifying lens is interposed between said circular cover and said illumination means cover.

5. An apparatus as in claim 4, wherein said conduction means is comprised of at least two wires.

* * * * *